United States Patent [19]

Umezu

[11] Patent Number: 5,701,299
[45] Date of Patent: Dec. 23, 1997

[54] METHOD OF AND APPARATUS FOR SWITCHING MULTI-SLOT TIME DIVISION SIGNALS

[75] Inventor: Akira Umezu, Tokyo, Japan

[73] Assignee: NEC Corporation, Tokyo, Japan

[21] Appl. No.: 588,315

[22] Filed: Jan. 18, 1996

[30] Foreign Application Priority Data

Jan. 25, 1995 [JP] Japan ......................... 7-9841

[51] Int. Cl.⁶ .................................................. H04Q 11/04
[52] U.S. Cl. .......................... 370/376; 370/379; 370/382; 370/514; 370/517
[58] Field of Search .................................. 370/357, 360, 370/375, 376, 378, 379, 381, 382, 383, 458, 459, 514, 517; 375/368, 371

[56] References Cited

U.S. PATENT DOCUMENTS

| | | | |
|---|---|---|---|
| 4,127,742 | 11/1978 | Couturier et al. | 370/378 |
| 4,543,652 | 9/1985 | Amanda et al. | 370/375 |
| 4,903,259 | 2/1990 | Hayano | 370/378 |
| 5,155,728 | 10/1992 | Takeuchi et al. | 370/378 |
| 5,467,340 | 11/1995 | Umezu | 370/244 |

FOREIGN PATENT DOCUMENTS

| | | |
|---|---|---|
| A0351386 | 1/1990 | European Pat. Off. . |
| A0483458 | 5/1992 | European Pat. Off. . |
| A0569960 | 11/1993 | European Pat. Off. . |
| A2469849 | 5/1981 | France . |
| A3227021 | 1/1984 | Germany . |
| WO 94 00960 | 1/1994 | WIPO . |

OTHER PUBLICATIONS

Patent Abstracts of Japan, Abstract of JP-A-3-092027.
Patent Abstracts of Japan, Abstract of JP-A-59-140793.

*Primary Examiner*—Alpus H. Hsu
*Attorney, Agent, or Firm*—Sughrue,Mion,Zinn,Macpeak & Seas, PLLC

[57] ABSTRACT

To reduce memory space of a speech path memory in a switching circuit for a multi-slot time division signal, only data in effective time slots of an input signal are stored one after another in a speech path memory to be switched into different time slot of an output signal in the present invention. Recording relations between time slot number of the input signal where data to be switched are carried and an address of the speech path memory where the data are stored, a conversion table converts switching control data indicating each time slot number of the input signal of data to be switched into each time slots of the output signal to address data of the speech path memory where the data to be switched are stored, and generates an idle bit pattern inserting signal when the data to be switched are not stored. So, memory space for storing idle channel patterns can be reduced of the speech path memory, enabling economizing total memory space more than a half of memory space needed for conventional switching circuits.

4 Claims, 5 Drawing Sheets

METHOD OF AND APPARATUS FOR SWITCHING MULTI-SLOT TIME DIVISION SIGNALS

BACKGROUND OF THE INVENTION

The present invention relates to a switching circuit of multi-slot time division signals, and more particularly to the switching circuit applied in digital exchanges.

FIG. 6 is a block diagram illustrating a conventional switching circuit of multi-slot time division signals. The circuit has a speech path memory (hereafter abbreviated to SPM) 1 for storing input signal DI of n channels to be switched, a control memory 2 for storing control data and sequential address counters (hereafter abbreviated to CNTs) 3 and 4 which generate reading address data CT1 and CT3 of the SPM 1 and the control memory 2 respectively in accordance with a frame pulse FP and a clock CK.

Referring to time charts shown in FIG. 7, operation of the conventional switching circuit of FIG. 6 is described. The input signal DI has n time slots for carrying data of n channels. When a channel is not occupied with communication data, a fixed pattern of pulses (called an idle channel bit pattern IL) is inserted in the corresponding time slot to be discriminated from communication data. Data in each time slot of the input signal DI are written in each corresponding address of the SPM 1. So, a memory space for n words carried in a frame of n time slots, that is n×9 bits, is prepared in the SPM 1, when a time slot carries data of a word of 9 bits.

The input signal DI registered in the SPM 1 is switched on time axis according to a control data C pre-loaded in the control memory 2 by a CPU (not shown in FIG. 6). For example, data 'a' and 'b' in the the first and the fifth time slots of the input signal DI of FIG. 7 are stored in corresponding addresses A1 and A5 of the SPM 1, while idle channel bit patterns stored in other addresses. In the control memory 2, a control data C is stored by the CPU for indicating each address of the SP1 for reading out data to be switched for each time slot of a multi-slot time division output signal DO, as the address data A1 in a fourth address corresponding to the fourth time slot Of the output signal DO and the address data A5 in a seventh address corresponding to the seventh time slot of the output signal DO.

Therefore, as the control data C, the address data A1 and A5 are read out from the control memory 2 at timings of the fourth and the seventh time slot of the output signal DO according to the address data CT3 generated by the CNT 4, and supplied to the SPM 1 as reading addresses for the output signal DO. Thus, data 'a' and 'b' in the first and the fifth time slot of the input signal DI are read out for the fourth and the seventh time slot of the output signal DO respectively.

In this way, a switching operation on time axis is performed.

Switching circuits of n channels of the prior art are to be provided with a speech path memory for storing n words carried in n time slots as described, but simultaneous occupation rate of time slots is less than a quarter in general when voice signals are carried and so, more than three quarters of the memory space are storing idle channel bit patterns in vain. This is a waste of memory space, and the larger memory space results the larger tip size, the more deficiency, the higher cost, etc. when the circuit is integrated to LSI.

SUMMARY OF THE INVENTION

Therefore, a primary object of the present invention is to provide a method of and an apparatus for switching a multi-slot time division signal for voice communication.

In order to achieve the object, a method of switching a multi-slot time division signal of the invention comprises;

a step of storing data in each of effective time slots of a multi-slot time division input signal one after another in a memory, and storing position data of said each of effective time slots in one of a set of registers, said one corresponding to an address of said memory storing data in said each of effective time slots of said multi-slot time division input signal;

a step of converting position data of a time slot to be switched of said multi-slot time division input signal, indicated by a CPU for recomposing a multi-slot time division output signal, into an address of said memory storing data corresponding to said time slot to be switched, when said time slot to be switched is one of said effective time slots referring to contents of said set of registers; and a step of recomposing said multi-slot time division output signal by reading out data at said address of said memory storing data corresponding to said time slot to be switched indicated by said CPU, and adding idle channel bit patterns in time slots of said multi-slot time division output signal when data corresponding to said time slot to be switched of said multi-slot time division input signal indicated by said CPU are not stored in said memory.

Therefore, memory space for storing idle channel bit patterns in time slots where effective data are not carried can be reduced from memory space needed for conventional switching circuits. As the simultaneous occupation rate of time slots is about one eighth to a quarter in general when voice signals are carried, total memory space, including memory space for converting position data to address data, can be reduced in the embodiment of the present invention to less than a half of memory space needed for conventional switching circuits.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

FIG. 2 (B) is a time chart illustrating operation of the embodiment of FIG. 1.

DETAILED DESCRIPTION OF THE PREFERRED EMBODIMENTS

Figure 1:
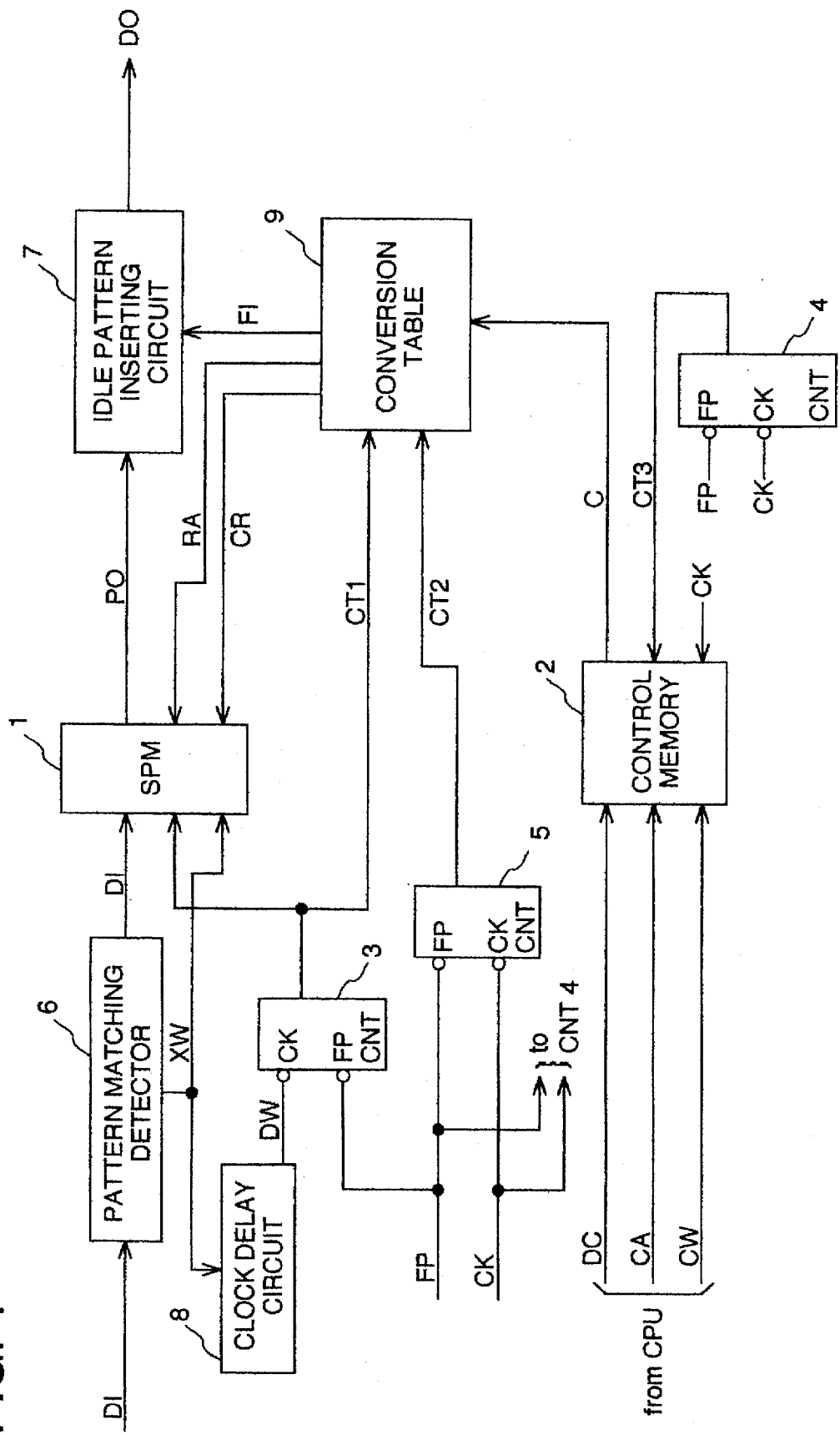
FIG. 1 is a block diagram of an embodiment of the present invention.

FIG. 1 is a block diagram of an embodiment of the present invention.

The embodiment, having a speech pass memory (SPM) 1, control memory 2, sequential address counters (CNTs) 3 and 4 as same as the prior art, further comprises a CNT 5 for generating second address data CT2 counting a clock CK and reset by a frame pulse FP, a pattern matching detector 6 for generating writing pulses XW for the SPM 1 discriminating communication data by detecting idle channel bit patterns of a multi-slot time division input signal DI, an idle pattern inserting circuit 7 for inserting an idle channel bit patterns IL into output PO of the SPM 1, a clock delay circuit 8 for generating a delayed signal DW by delaying the writing pulses XW for one clock period, and a conversion table 8 for converting a control data C to reading addresses for the SPM 1 wherein input data are written eliminating idle channel bit patterns controlled by the writing pulses XW.

Figure 3:
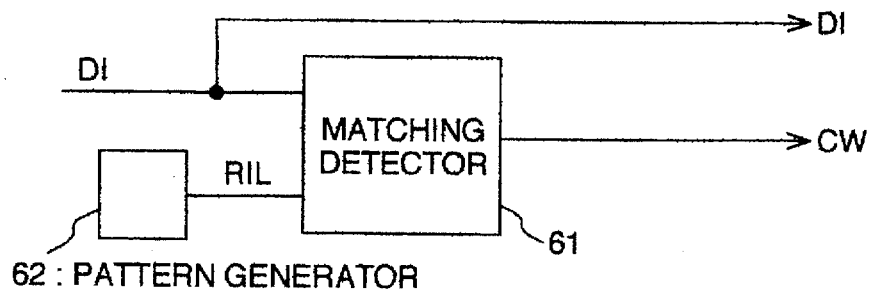
FIG. 3 is a block diagram of an example of a pattern detector 6 of FIG. 1.

Referring to a block diagram shown in FIG. 3, the pattern matching detector 6 has a matching detector 61 which generates a writing pulse XW when a pattern of data of a time slot accords to a reference idle channel bit pattern RIL supplied by a pattern generator 62.

Now, operation of the embodiment is described in connection with FIG. 1 and a time chart of FIG. 2.

Figure 7:
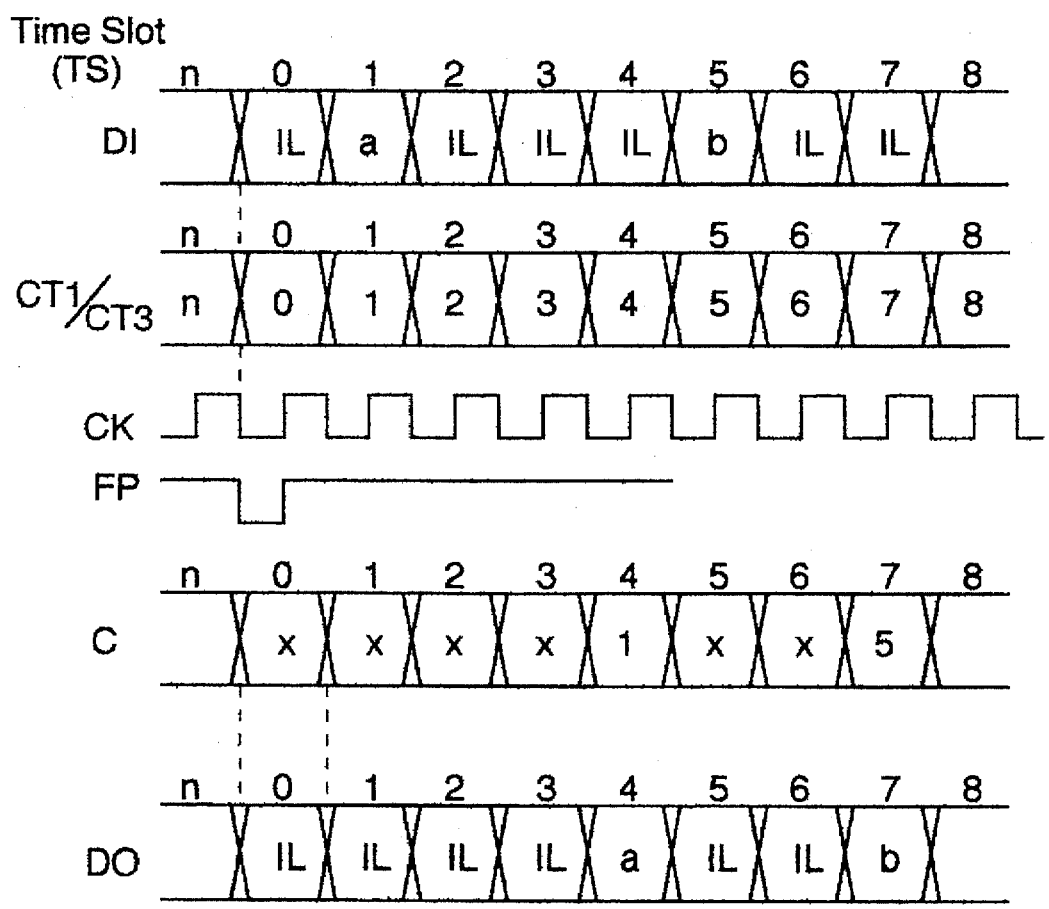
FIG. 7 is a time chart illustrating operation of the conventional switching circuit of FIG. 6.

In a first and a fifth time slots of the input signal DI, for example, data 'a' and 'b' are carried while other time slots are filled with the idle channel bit patterns IL as the example shown if FIG. 7.

When the input signal DI is delivered to the pattern matching detector 6, a negative pulse of a fixed width indicating existence of communication data is generated as the writing pulse XW at each time slot which is filled with communication data, that is data different from the idle channel bit pattern IL. The writing pulse XW is delivered to the SPM 1 and the clock delay circuit 8, while the input signal DI being supplied to the SPM 1. The clock delay circuit 8 generates the delayed signal DW to be delivered to the CNT 3. The CNT 3 generates first address data CT1 for the SPM 1 by counting the delayed signal DW.

Figure 2:
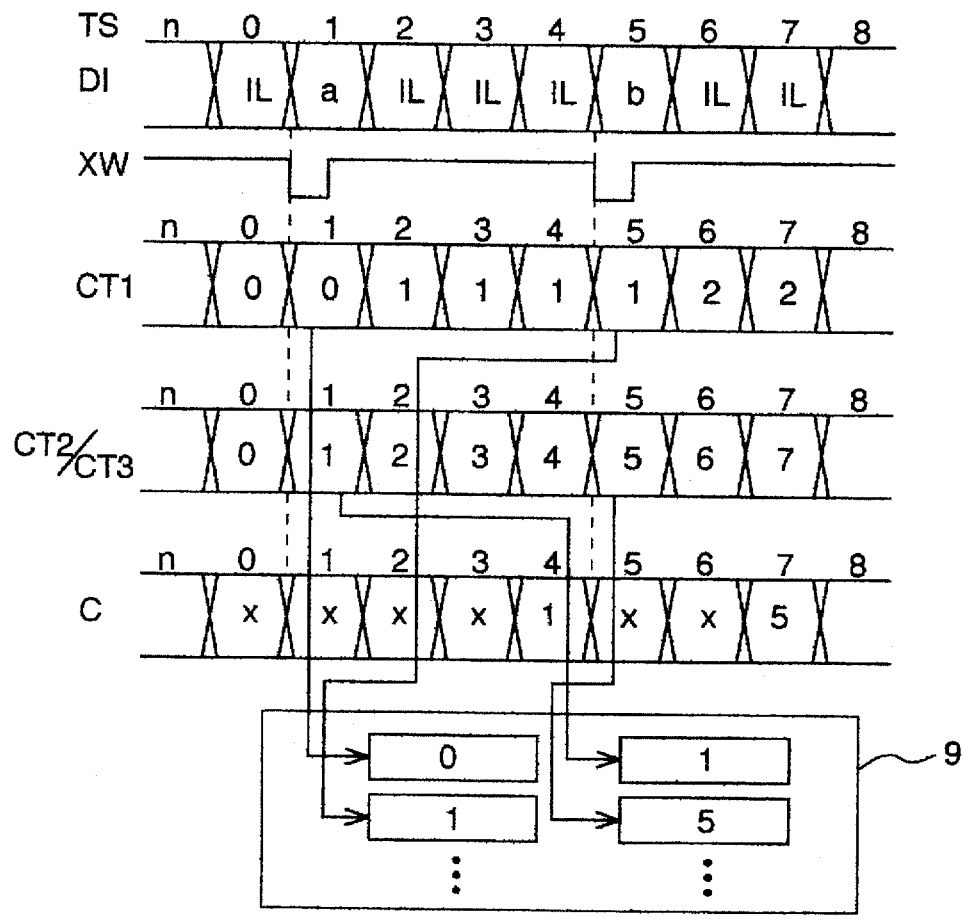
FIG. 2 (A) is a time chart illustrating operation of the embodiment of FIG. 1.
Figure 2:
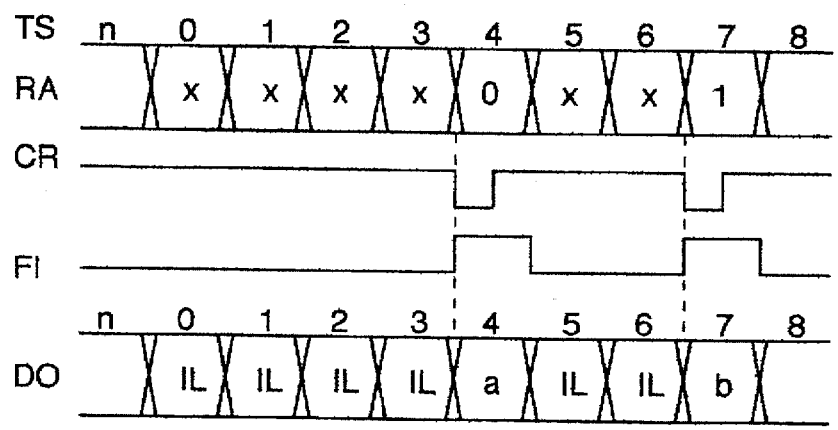

Referring to FIG. 2 (A), the data 'a' and 'b' in the first and the fifth time slots are stored in addresses 0 and 1 of the SPM 1 respectively, since the first address data CT1 are increased by the CNT 3 counting the pulses of delayed signal DW just after the data writing. The second address data CT2 are generated by the CNT 5 counting the clock CK and delivered to the conversion table 9 as address data indicating input time slot number together with the first address data CT1 indicating the addresses of the SPM 1 where the data are stored.

Figure 4:
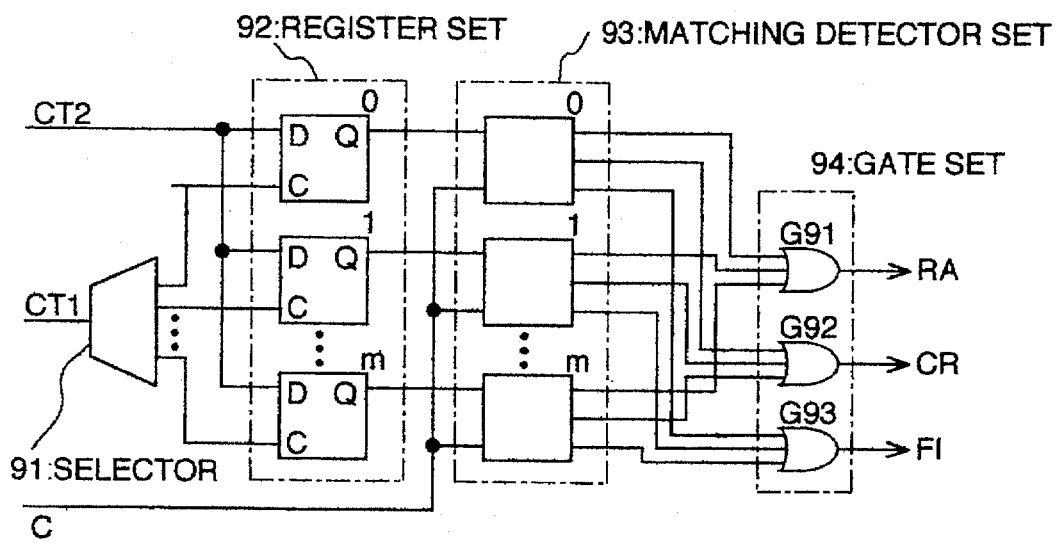
FIG. 4 is a block diagram of an example of a conversion table 9 of FIG. 1.

FIG. 4 shows a block diagram of an example of the conversion table 9 in FIG. 1. The conversion table 9 comprises a register set 92 of m registers numbered form 0 to m-1 which store the address data CT2, a selector 91 which selects a register corresponding to the first address data CT1 between the registers of the register set 92 and delivers a write enabling pulse to the selected register, a matching detector set 93 of m matching detectors numbered from 0 to m-1 which detect pattern matching of the data output of the registers of the register set 92 with the control data C read out of the control memory 2, and a gate set 94 composed of OR gates G91, G92 and G93 which generate the reading addresses RA and reading pulses CR for the SPM 1, and idle pattern inserting pulses FI, when no matching detector detects any pattern matching, from outputs of the matching detectors of the matching detector set 93 respectively.

The second address data CT2 indicating the slot number of the input signal DI are over written in one of registers in the register set 92 when the register is write enabled selected by the selector 91 according to the first address data CT1 which are increased just after data of a slot are written in the SPM 1, and the last written data are output from the register when the register is write disabled. So, the data of the slot number are output to a matching detector of the matching detector set 93 corresponding to the write address of the SPM 1 storing the data of the slot number. In the example shown in FIG. 2 (A), the first and the second register output the slot numbers 1 and 5 respectively.

In the control memory 2, the control data C are pre-loaded by the CPU for indicating each input slot number to be read out of the SPM 1 and switched into each output slot number, as input slot numbers one and five in addresses four and seven corresponding to output slot numbers in the example.

Each matching detector of the matching detector set 93 compares values of the control data C, which are read out from the control memory 2 at addresses indicated by the third address data CT3 generated sequentially by the CNT 4, with the value delivered from each corresponding resistor. When a value of the data C is matched with value stored in a matching detector, the matching detector outputs data corresponding its order number and a timing pulse synchronized with the time slot of the output signal where data to be switched. Thus, the converted reading addresses RA, reading pulses CR and idle pattern inserting pulses FI are obtained through OR gates G91, G92 and G93, where the reading pulses CR are at low level when indicating reading timings and the idle pattern inserting pulses FI are inverse logic of the reading pulses CR.

As above described, the conversion table 9 stores the second address data CT2 corresponding to the input slot number in addresses indicated by the first address data CT1 which do not increase but with slots carrying communication data as shown in FIG. 2 (A) . And it converts the control data C to the reading address data RA for the SPM 1 as shown in FIG. 2 (B), where data one and five in address four and seven in the control memory 2 are converted to zero and one in the reading addresses RA by the conversion table 9 for reading out data 'a' and 'b' into fourth and seventh slots of the output signal DO.

Figure 5:
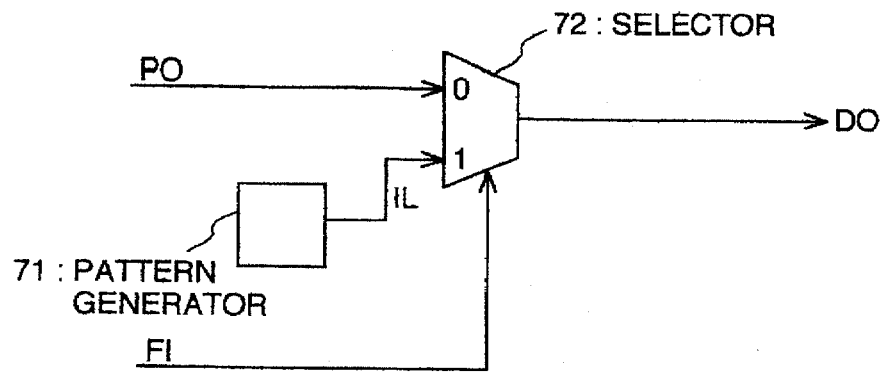
FIG. 5 is a block diagram of an example of an idle pattern inserting circuit 7 of FIG. 1.
Figure 6:
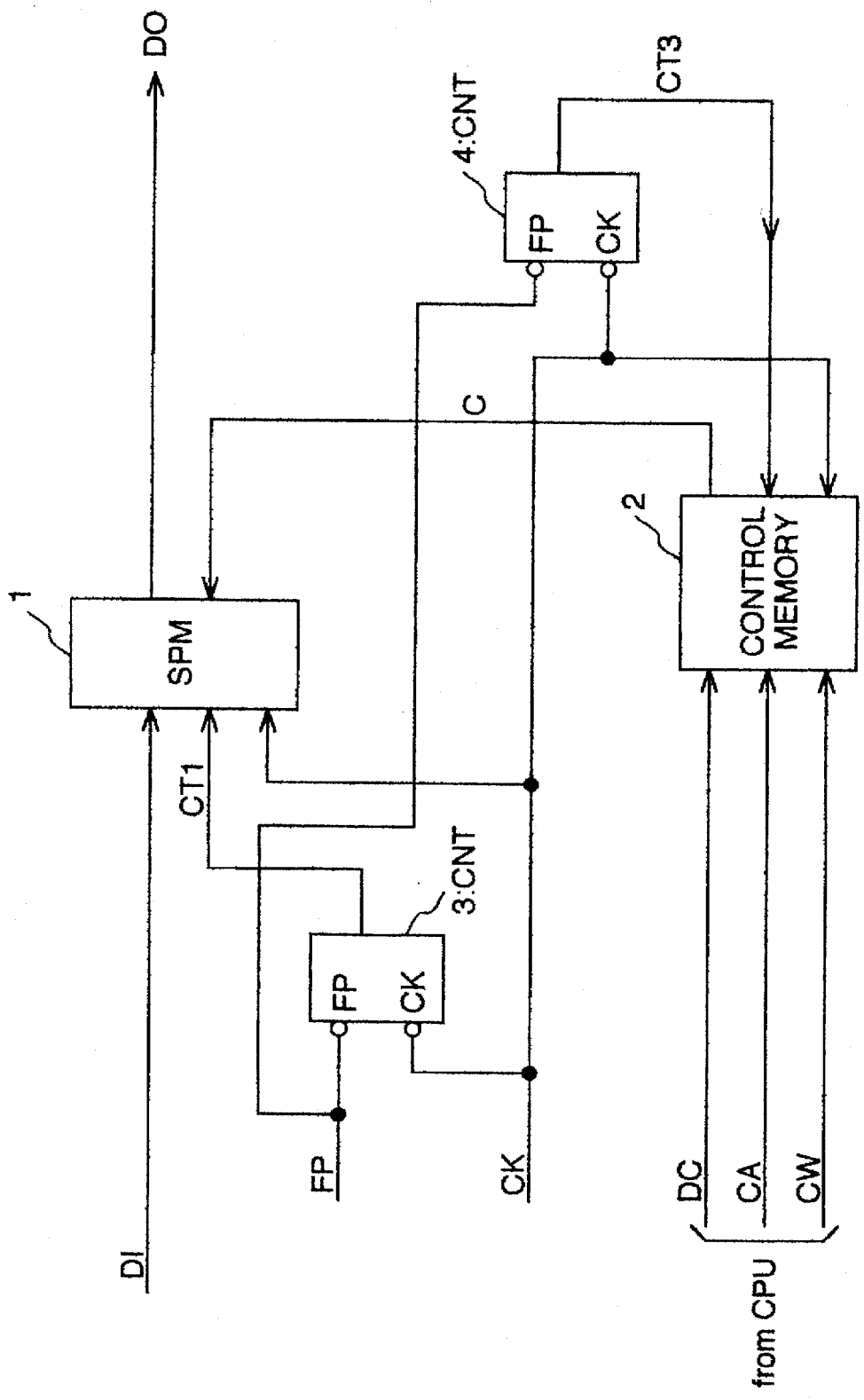
FIG. 6 is a block diagram of a conventional switching circuit.

FIG. 5 shows an example of the idle pattern inserting circuit 7 comprising a pattern generator 71 Which generates the same idle pattern with the reference idle channel bit pattern generated by the first pattern generator 62 and a selector 72 which selects either data for the output signal DO from data read out of the SPM 1 or the idle channel patterns according to the idle pattern inserting pulsed FI.

Thus, the data 'a' and 'b' in the first and the fifth time slots of the input signal DI of n channels can be switched to the fourth and seventh time slots of the output signal DO in the embodiment, where memory space required for the SPM 1 is m×9 bits when a slot is composed of a word of 9 bits and m is the maximum number of slots simultaneously occupied with communication data. As for the memory space of the conversion table 9, it is also about m×9 when address data are composed of 9 bits, that is, when the total number of time slots is $2^9$ (512).

Since the simultaneous occupation rate of time slots in a multi-slot time division signal is about one eighth to a quarter in general when voice signals are carried, total memory space including memory space for the conversion table 9 in the embodiment of the present invention can be reduced to less than a half of memory space needed for conventional switching circuits, enabling size reduction and cost decrease for the integration of the switching circuit to LSI tips.

What is claimed is:

1. A method of switching a multi-slot time division signal, comprising:

a step of storing data in each of effective time slots of a multi-slot time division input signal one after another in a memory, and storing position data of said each of effective time slots in one of a set of registers, said one corresponding to an address of said memory storing data in said each of effective time slots of said multi-slot time division input signal;

a step of converting position data of a time slot to be switched of said multi-slot time division input signal, indicated by a CPU for recomposing a multi-slot time division output signal, into an address of said memory storing data corresponding to said time slot to be switched, when said time slot to be switched is one of said effective time slots, referring to contents of said set of registers; and a step of recomposing said multi-slot time division output signal by reading out data at said address of said memory storing data corresponding to said time slot to be switched indicated by said CPU, and adding idle channel bit patterns in time slots of said multi-slot time division output signal when data corresponding to said time slot to be switched indicated by said CPU are not stored in said memory.

2. A method of switching a multi-slot time division signal recited in claim 1 wherein said step of storing data in each of effective time slots having:

a step of generating a write address of said memory for data in said each of effective time slots of said multi-slot time division input signal by counting pulses generated when bit patterns of data in time slots of said multi-slot time division input signal do not match with said idle channel bit pattern; and a step of writing data in said each of effective time slot at said write address of said memory generated in said step of generating a write address.

3. An apparatus for switching a multi-slot time division signal, comprising:

a pattern matching detector for generating write pulses when effective data are carried in time slots of a multi-slot time division input signal by detecting idle channel bit patterns of data in time slots of said multi-slot time division input signal wherein effective data are not carried;

a clock delay circuit for delaying said write pulses for one period of a clock which is synchronized with time slots of said multi-slot time division input signal;

a write address counter for counting output of said clock delay circuit;

a memory for storing data in each of effective time slots of said multi-slot time division input signal at an address generated by said write address counter;

switching control means for indicating a slot number of said multi-slot time division input signal carrying data to be switched into each of time slots of a multi-slot time division output signal;

a conversion table for converting said slot number of said multi-slot time division input signal indicated by said switching control means into an address of said memory storing data carried in said slot number of said multi-slot time division input signal and generating an idle pattern inserting pulse when data carried in said slot number of said multi-slot time division input signal indicated by said switching control means are not stored in said memory; and output means for recomposing said multi-slot time division output signal by reading out data stored at said address of said memory converted by said conversion table and adding a bit pattern same with said idle channel bit patterns when said idle pattern inserting pulse is delivered from said conversion table.

4. An apparatus for switching a multi-slot time division signal recited in claim 3 wherein said conversion table having:

a set of a predetermined number of registers, said predetermined number being same with a total number of addresses of said memory and smaller than a total number of time slots of said multi-slot time division input signal, and each of said resistors storing a slot number of said multi-slot time division input signal wherein data stored in an address of said memory corresponding to said each of said resistors are carried, and outputting said slot number stored therein; and a set of said predetermined number of pattern matching detectors, each of said pattern matching detectors detecting pattern matching between said slot number output from one of said registers corresponding to said each of said pattern matching detectors and said slot number indicated by said switching control means, and generating a reading address corresponding to an order number thereof and a timing pulse for reading out data stored in said memory when said pattern matching is detected and said idle pattern inserting pulse when said pattern matching is not detected.

* * * * *